(12) United States Patent
Smolski (10) Patent No.: US 7,818,619 B2
(45) Date of Patent: Oct. 19, 2010

(54) METHOD AND APPARATUS FOR DEBUGGING APPLICATION SOFTWARE IN INFORMATION HANDLING SYSTEMS OVER A MEMORY MAPPING I/O BUS

(75) Inventor: Steven Joseph Smolski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 11/847,333

(22) Filed: Aug. 30, 2007

(65) Prior Publication Data

US 2009/0063903 A1    Mar. 5, 2009

(51) Int. Cl.
*G06F 11/00* (2006.01)
(52) U.S. Cl. ............................... 714/25; 714/27; 714/31
(58) Field of Classification Search ................... 714/10, 714/11, 25, 27, 28, 29, 30, 31, 32, 38, 39, 714/41, 45, 51
See application file for complete search history.

(56) References Cited

U.S. PATENT DOCUMENTS

| | | | |
|---|---|---|---|
| 6,502,209 B1 * | 12/2002 | Bengtsson et al. | 714/10 |
| 6,584,586 B1 * | 6/2003 | McCoy | 714/45 |
| 6,763,385 B1 * | 7/2004 | Orfali | 714/25 |
| 6,810,442 B1 | 10/2004 | Lin | |
| 6,983,398 B2 * | 1/2006 | Prabhu | 714/31 |
| 7,194,660 B2 * | 3/2007 | Edrich | 714/30 |
| 7,543,184 B2 * | 6/2009 | Dean et al. | 714/32 |
| 2005/0034039 A1 * | 2/2005 | Prasadh et al. | 714/727 |
| 2005/0188358 A1 * | 8/2005 | Johnson et al. | 717/129 |
| 2006/0048026 A1 | 3/2006 | Fine | |

OTHER PUBLICATIONS

Mathis—IBMeServer P5 575 Ultra-Dense, Modular Cluster Node for High Performance Computing—IBM Systems and Technology Group (Oct. 4, 2005).
IBM—IBMeServer Cluster 1600 Facts and Features—IBM Marketing Communications Systems Group (Feb. 24, 2004).
Typaldos—Random Test Generation for Multi-processor Systems—Obsidian Software (2004).

* cited by examiner

*Primary Examiner*—Robert Beausoliel
*Assistant Examiner*—Joseph D Manoskey
(74) *Attorney, Agent, or Firm*—Matt Talpis; Mark P Kahler (57) ABSTRACT

A test system includes a debugging system and a system under test (SUT). The debugging system includes a debugging processor that couples to an SUT processor in the SUT via a memory mapping interface bus therebetween. In one embodiment, the debugging processor operates as a master to conduct test operations on the SUT via the memory mapping interface bus. The debugging processor and the SUT processor operate together in a cluster mode to provide non-invasive debugging of the (SUT) while the SUT executes application software in a real time environment.

20 Claims, 4 Drawing Sheets

METHOD AND APPARATUS FOR DEBUGGING APPLICATION SOFTWARE IN INFORMATION HANDLING SYSTEMS OVER A MEMORY MAPPING I/O BUS

TECHNICAL FIELD OF THE INVENTION

The disclosures herein relate to information handling systems, and more particularly, to the efficient debugging and testing of information handling systems under test in a multitasking environment.

BACKGROUND

An information handling system (IHS) may include one or more processors for processing, handling, communicating or otherwise manipulating information. A multi-core processor is one term that describes a processor with multiple processors or cores integrated in a common integrated circuit (IC). One example of a multi-core processor is a cell broadband engine (CBE) processor such as shown in the publication entitled "Cell Broadband Engine Architecture, Version 1.0", by IBM Corp, Sony and Toshiba, Aug. 8, 2005, the disclosure of which is incorporated herein by reference in its entirety. An IHS may concurrently support multiple operating systems. Moreover, multiple software program applications may execute within the IHS at the same time. For example, an IHS may execute a test program application for debugging existing hardware and software and at the same time execute a program for calculating and sending graphics data to a display. A multi-processing environment is an environment in which multiple programs execute or run concurrently. Multi-processing environments are commonplace in conventional processor architectures and require extensive and complex testing scenarios.

Information handling system designers, users, and other entities require the ability to test IHSs in a variety of configurations to verify capability and functionality. System designers may use a test methodology to test an IHS for basic high level functionality during the integrated circuit fabrication process. For example, a test process may check integrated circuits for speed and discard integrated circuits that test slow. The test process may alternatively separate integrated circuits into categories of circuits, for example circuits useful in slower speed applications and circuits useful in faster speed applications. Other test methodologies provide for testing IHSs after fabrication processing and prior to integration into a larger more complex system. Such test methodologies may involve basic IC and component level testing. For example, testing may include providing power to the IHS and injecting signals into input busses and monitoring output busses for proper data values, timing signals, and other testable criteria. IHS test methods may include provisions for application of external environmental parameters such as temperature, humidity, power supply noise level, and other variable inputs. Typically after functional testing yields a good IHS, the next level of testing operates in real life or real time environments. Real time tests require the introduction of test methodologies to a fully functioning IHS.

Although testing may include on-board test hardware and software within the IHS, eventually test results must be written to some external device for system users to interpret. As IHSs become more and more complex, the testing methodologies must likewise become more complex for accurate and complete testing. One particular test methodology relies on the external communication from a controlling IHS to an IHS under test. The controlling IHS may communicate through an external communication bus to the IHS under test. The speed and effectiveness of the communication bus and the hardware and software that manages the communications becomes a large factor in the capability and effectiveness of this style of testing methodology. This style of testing and other conventional testing strategies introduce unknown effects upon the IHS under test by the invasive nature of the test methodologies.

What is needed is a method and apparatus that more completely utilizes the effective communication interfaces of complex IHSs in a test architecture and solves the problems above.

SUMMARY

Accordingly, in one embodiment, a method is disclosed for testing a system under test (SUT). The method includes providing a debugging system with a first processor including a first memory mapping input output (I/O) interface. The method also includes providing the system under test (SUT) with a second processor including a second memory mapping input output (I/O) interface. The method further includes configuring the debugging system and the SUT together in a cluster mode wherein the first processor acts as a debugging master that executes test software and the second processor acts as a slave that executes application software. The first processor communicates with the second processor via a memory mapping interface bus between the first and second memory mapping I/O interfaces. The method still further includes conducting test operations, by the debugging system, on the SUT wherein the test software in the debugging system accesses at least one of memory, registers and non-volatile storage of the SUT via the memory mapping interface bus.

In another embodiment, a test system is disclosed that includes a debugging system including a first processor. The first processor includes a first memory mapping input output (I/O) interface. The test system also includes a system under test (SUT) including a second processor. The second processor includes a second memory mapping input output (I/O) interface. The SUT also includes a memory, registers and nonvolatile storage. A memory mapping interface bus couples the first memory mapping I/O interface of the first processor to the second memory mapping I/O interface of the second processor such that the debugging system and the SUT operate in a cluster mode to communicate over the memory mapping interface bus. The first processor of the debugging system is configured to act as a master that executes test software while the second processor of the SUT executes application software, thus enabling the debugging system to conduct test operations on the SUT over the memory mapping interface bus.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Information handling system (IHS) designers, users, and other entities require the ability to test IHSs in a variety of configurations. For example, one configuration may involve loading debugging or testing software into an IHS under test, also known as a system under test (SUT). Those skilled in the art may also refer to the SUT as a device under test (DUT), unit under test (UUT) and other terms that note which particular IHS is the focus of a test strategy. In a single IHS configuration, software executing within the IHS or SUT performs a variety of tests to determine if the SUT functions properly. Operating system software within the SUT writes test results into memory, on a display, or across a communications bus to any external device where interpretation by system users is practical. Another configuration scenario involves multiple IHSs wherein one IHS operates as the debugging system, and another IHS operates as the SUT. Multiple IHS configurations require a communication bus between the debugging system and the SUT. Some test methodologies involve testing scenarios wherein two IHSs interact.

Figure 1:
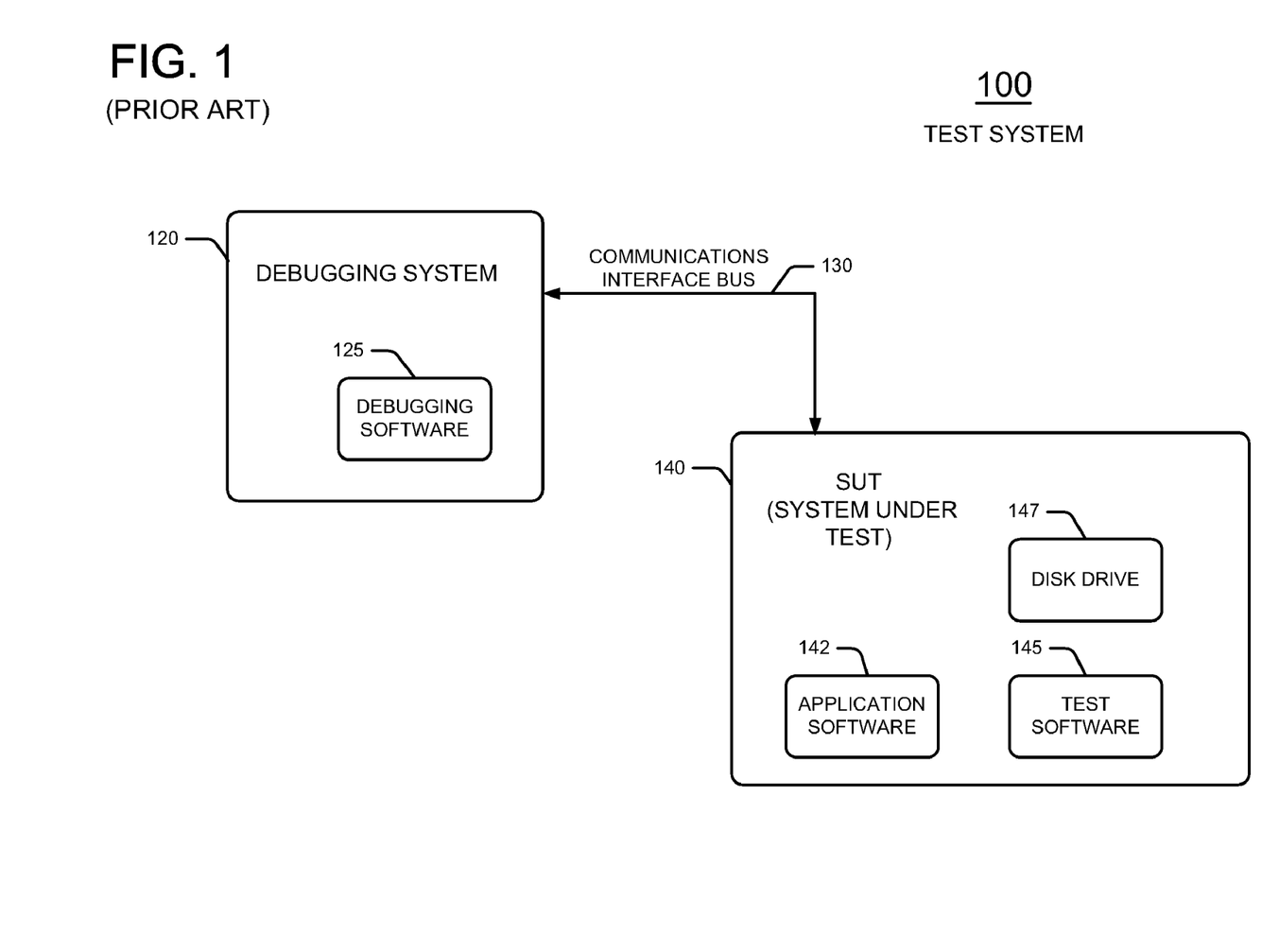
FIG. 1 shows a block diagram of a conventional test system methodology.

FIG. 1 depicts one conventional test system 100 and corresponding test methodology. Test system 100 relies on multiple IHSs to provide a workable test environment. Test system 100 includes both a debugging system IHS 120 and a system under test (SUT) IHS 140. Debugging system 120 includes debugging software 125 that manages the debugging and testing of SUT 140. Debugging software 125 loads in debugging system 120 from an external memory source or storage medium (not shown). A communications interface bus 130 couples debugging system 120 to system under test SUT 140. The communications interface bus 130 may employ an RS-232, Ethernet, USB, or other communications protocol for managing data and test program control between IHSs, namely between debugging system 120 and SUT 140. SUT 140 includes application software 142, as shown. Application software 142 loads from an external memory source or storage medium device (not shown). Application software 142 provides the fundamental software control for SUT 140 during normal real time operations. Application software may include one or more user applications. However, during testing operations, test software 145 loads from any external memory source or storage medium (not shown). Test software 145 includes software instructions that provide functional testing of SUT 140 during a test operation. SUT 140 may contain other operational software such as operating system (OS) software (not shown). SUT 140 may also include other high level software for interacting with application software 142 and test software 145 during a test operation. For example, the SUT 140 may run a user application program for calculating graphics display data and at the same time run test software 145 in a cooperative multitasking manner. One example of test software application 145 that loads into IHSs such as SUT 140 is SoftICE (Software In Circuit Emulator). (SoftICE is a trademark of Compuware). SoftICE may run cooperatively as a kernel mode debugger in SUT 140 with conventional user application programs. A SoftICE application or other test software application may run as a debugger within a Microsoft Windows operating system application or any other IHS operating system environment. (Microsoft and Windows are trademarks of Microsoft Corporation.) Other test software system kernel debuggers include WinCE, WinDBG, etc. Other operating systems include UNIX, Linux, OS/2, etc.

One problem with the test methodology of FIG. 1 becomes evident when SUT 140 sends data to a slow peripheral such as a disk drive 147. Disk drive 147 represents one of multiple other peripherals (not shown) of SUT 140 that may execute at unpredictable communication rates. In a test environment, test software 145 typically executes or runs as a series of single step instructions or instruction groups. If disk drive 147 responds slowly, the test instructions executing within test software 145 may respond without error, given the slow functioning of SUT 140 executing test software 145. More particularly, while test software 145 is executing, SUT 140 steps through each test instruction more slowly than normal, effectively allowing slow peripherals to catch up. Disk drive 147 represents only one example of a peripheral that may respond at variable rates. Other peripherals that may exhibit this characteristic include CD drives, external hard drives, USB devices, etc. During test software 145 operations, the data that SUT 140 requests from a hard drive 147 may have adequate time to settle and become available to the requesting device. However, when SUT 140 runs normal user application software 142 without test software 145 executing, disk drive 147 may fail to respond in a timely manner and the application software fails to execute properly. In this example, SUT 140 thus fails during real time operations and yet successfully passes during test operations. System users typically define these types of problems as timing issues, which may be found in many other locations in SUT 140 as well. For example, timing issues due to slow device response may occur across internal busses or across external bus communication as well. The problem here is that test software 145 modifies the normal real time operation of SUT 140 and is thus invasive to SUT 140 operation. Invasive test software operations cause modification to the execution of user application software by SUT 140 or other IHS. Unfortunately, in this manner, invasive test software affects the execution of real world user application software, and may thus produce false test data as a result.

Test software 145 may further modify the normal behavior of SUT 140 due to the nature of multi-tasking test instructions that execute concurrently with application software 142 instructions. This modification of SUT 140 behavior presents another problem with the methodology of conventional test system 100. When test software 145 runs concurrently with application software 142, SUT 140 does not run in a real time environment. The interaction between test software 145 and the rest of SUT 140 operations causes unpredictable changes in the normal operation of SUT 140.

Another test methodology involves executing debugging software 125 within debugging system 120 as the primary control over testing operations in SUT 140. This method requires extensive communications across interface bus 130 which exhibits inherent speed limitations. As above, this invasive testing methodology does not allow SUT 140 to run in a real time environment. The communication between debugging system 120 and SUT 140 slows down test operations and SUT 140 operations. Slowing down the testing process of SUT 140 in this manner provides less test result data over time. One technique to alleviate the large communications load across interface bus 130 is to allow SUT 140 to run through several instructions before debugging system 120 performs interrogation of SUT 120 for test results. Although this may speed up the testing process within SUT 140, test data results may be lost when subsequent operations perform writes over the existing test data results before debugging system 120 can read and interpret these results. Moreover, in this scenario, debugging system 120 may read test data late and require resources to guess the causes of false data readings in SUT 140. Unfortunately, this may result in questionable test data integrity and time consuming analysis.

The invasive nature of this type of test methodology introduces challenging test opportunities for system designers and system users. A better testing methodology approach involves employing an IHS as the system under test SUT in real time and minimizing the invasiveness or interruption of normal operations of application software while testing basic IHS functionality. One such test methodology for testing basic IHS functionality is described below in the system of FIG. 2.

Figure 2:
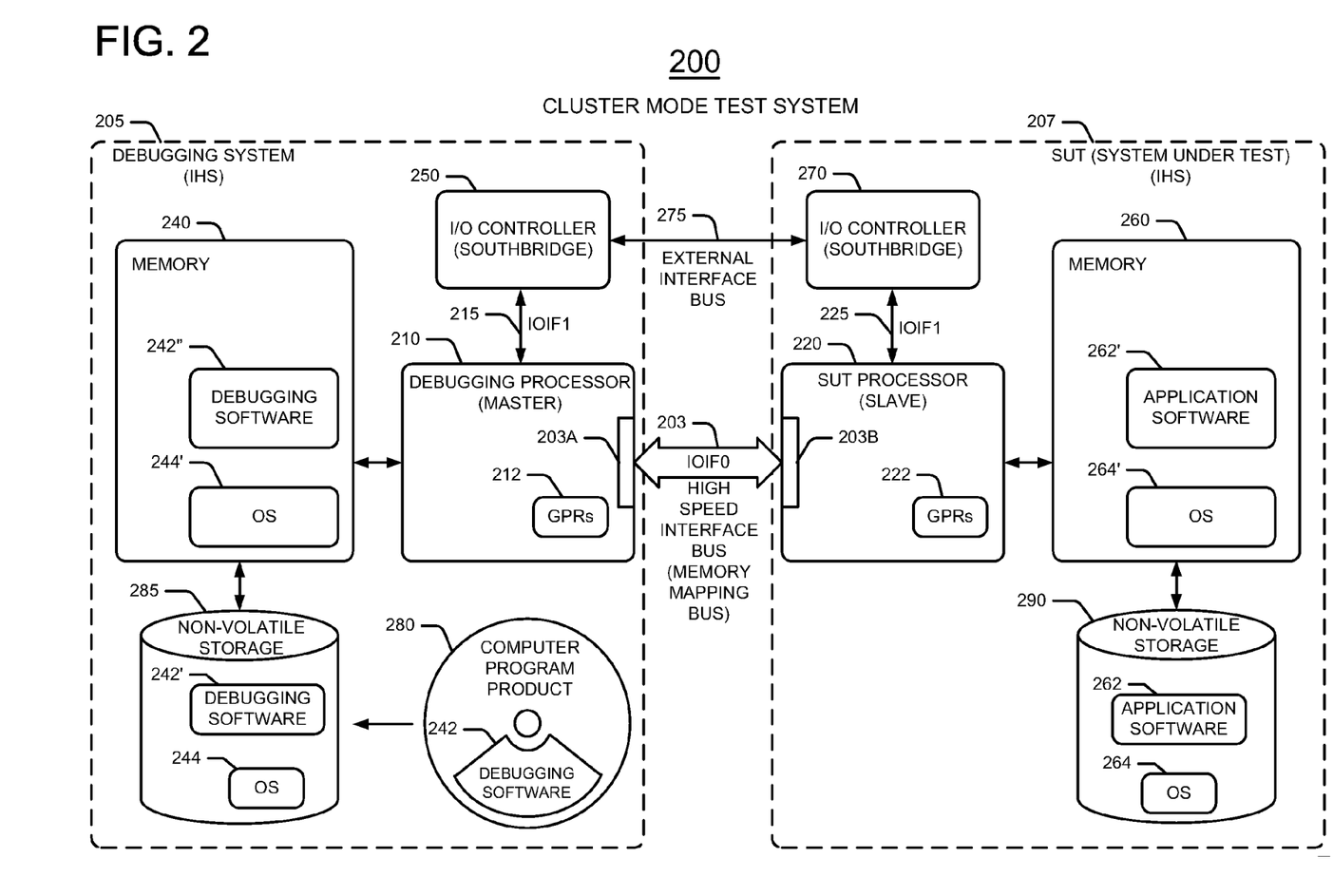
FIG. 2 shows a diagram of the disclosed multiple IHS cluster mode test system methodology.

FIG. 2 shows a cluster mode test system 200 and methodology that utilize a memory mapping high speed communications interface bus 203 between a debugging system 205 IHS and an SUT 207 IHS. Cluster mode describes a special system configuration wherein two processors of a larger system communicate across a common communications interface. In cluster mode systems, the processors may be cell broadband engine (CBE) processors and the communication bus a high speed interface bus with memory mapping capability. A debugging processor 210 in debugging system 205 couples to an SUT processor 220 in SUT 207 via a memory mapping interface channel, or memory mapping, high speed interface bus IOIF0 203. In this particular embodiment, debugging processor 210 includes general purpose registers (GPRs) 212. SUT processor 220 contains general purpose registers (GPRs) 222. A memory 240, such as random access memory (RAM), couples to debugging processor 210 to provide memory resources thereto. Debugging processor 210 couples to an I/O controller 250 via a communications interface bus IOIF1 215. I/O controller 250 is an I/O (Input/Output) controller that manages communications to other interfaces such as PCI, IDE, ISA, USB, Ethernet or other communication interfaces typically recognizable as the slower interface busses of IHSs. For example, I/O controller 250 may be a Southbridge controller. In SUT 207, a memory 260 couples to SUT processor 220 to provide memory resources thereto. SUT processor 220 couples to an I/O controller 270 via a communications interface bus IOIF1 225. I/O controller 270 couples to I/O controller 250 via an external communications bus 275.

Debugging processor 210 and SUT processor 220 respectively include a memory mapping interface 203A and 203B that couple to high speed memory mapping interface bus IOIF0 203. Memory mapping interfaces 203A and 203B and memory mapping bus 203 together allow debugging processor 210, acting as a test master, to access (read and write) values in the general purpose registers (GPRs) 222, memory 260 and non-volatile storage of SUT 207 while conducting test operations. If desired, memory mapping interfaces 203A and 203B and memory mapping bus 203 together allow SUT processor 220 to access (read and write) values in the general purpose registers (GPRs) 212, memory 240 and non-volatile storage of SUT 285 of debugging system 205 as well as the memory mapped registers of the I/O controller 250 (e.g. a Southbridge controller) over the memory mapped IOIF1 bus 215. One processor that employs a suitable high speed memory mapping interface usable as interface 203A or 203B is the cell broadband engine processor (CBE) type processor. Cell broadband engine (CBE) processor are shown in the publication entitled "Cell Broadband Engine Architecture, Version 1.0", by IBM Corp, Sony and Toshiba, Aug. 8, 2005, the disclosure of which is incorporated herein by reference in its entirety. The CBE processor is a heterogeneous processor, namely a processor that includes multiple cores, at least one of which is different from the architecture of the other cores. In one embodiment, both debugging processor 210 and SUT processor 220 are CBE type heterogeneous processors. In the embodiment shown in FIG. 2, using CBE type processors that support memory mapping interfaces allows SUT 220 to access Southbridge I/O controller 250, and further allows the debugging processor 210 to access Southbridge I/O controller 270. Bus 215 (IOIF1) and bus 225 (IOIF1) are memory mapping busses. In other processor applications, they may be relatively low speed local busses. Busses 215 and 225 may be relatively low speed interrupt driven busses in contrast to the high speed memory mapping bus 203. In one embodiment, debugging processor 210 and SUT processor 220 exhibit substantially the same architecture.

Debugging processor 210 operates together in a cluster mode with SUT processor 220 via high speed memory mapping bus 203. In one embodiment, debugging processor 210 operates as a master and SUT processor 220 operates as a slave that debugging processor 210 may control over memory mapping bus 203 to conduct test operations on SUT 207. Memory mapping bus 203 and memory mapping interfaces 203A and 203B make it possible for both master debugging processor 210 and slave SUT processor 220 to write to the same memory space, namely the same addresses. Both processors may access the same physical addresses of memory whether it be memory 240 or memory 260 via memory mapping bus 203.

In one embodiment, cluster mode test system 200 includes a computer program product 280 that includes a debugging software program 242 as described herein. Computer program product 280 may be in the form of a disk, cartridge or other movable storage media. Cluster mode test system 200 also includes a non-volatile storage 285 that stores debugging software 242' and operating system (OS) 244. Memory 240 contains debugging software 242" and OS 244' for use by debugging system 205. Memory 260 contains application software 262' and OS 264' for use by SUT 207. Cluster mode test system 200 also includes a non-volatile storage 290 that stores application software 262 and operating system OS 264. Memory 260 contains application software 262' and OS 264' for use by debugging system 205.

Computer program product 280 is a CD, DVD, other media disk, media drive, cartridge or other storage medium. A user or other entity supplies computer program product 280 to non-volatile storage 285 for storage therein. In this manner, non-volatile storage 285 stores the debugging software 242' along with OS 244. When cluster mode test system 200 initializes or boots up, debugging software 242' and OS 244 load into memory 240 as debugging software 242" and OS 244' for use by debugging system 205. In this manner, the debugging software test program is available for use by system users, programmers and other entities that test cluster mode test system 200. In a similar manner, application software 262' and OS 264' load into memory 260 for use by system under test SUT 207.

The architecture of the disclosed cluster mode test system 200 as shown provides for high speed communications between debugging system 205 and SUT 207. Operating system OS 244' of debugging system 205 and OS 264' of SUT 207 fully map all memory, registers, and any other physical storage locations that reside in IHS SUT 207 through IOIF0 bus 203 for access by IHS debugging system 205. This memory mapping capability through IOIF0 203 provides a window for one IHS such as debugging system 205 to view the actions and memory resources of SUT 207 in a real time operating mode. The memory mapping capability as shown is non-invasive. In other words, the actions of one IHS such as debugging system 205 do not interfere with the actions of SUT 207 during normal and test operations. IOIF0 bus 203 manages communications through hardware functions rather than software. Therefore, these communications do not require software interrupts or other such invasive techniques to share data between debugging system 205 and SUT 207.

Moreover, I/O controller 270 communications may employ a memory map through IOIF0 203 and are thus available to debugging system 205 for interrogation without any impact to SUT 207 communications. For example, if SUT processor 220 writes to a register within SUT 207 such as general purpose register 222 with a hex data value, then debugging processor 210 has immediate access to that hex data value. Due to the memory map capability of cluster mode test system 200, the hex data value is immediately available through the IOIF0 bus 203 to debugging system 205 for viewing. It is important to note that in this particular cluster mode configuration, debugging system 205 may also change the data at any memory location within SUT 207 as well without any input or direction from SUT 207. With the interaction between debugging system 205 and SUT 207 executing non-invasively, SUT 207 runs in a real time operations mode.

One helpful approach to understanding the non invasive test capability of the disclosed cluster mode test system 200 is to consider the scenario wherein SUT processor 220 runs or executes application software 262'. While application software 262' is executing, debugging system 205 may interrogate, view or modify memory locations within SUT 207 with no apparent impact on the normal execution of application software 262'. Debugging software 242" runs within debugging system 205 for the purpose of testing SUT 207. Another aspect of the cluster mode architecture shown in FIG. 2 may involve the communication from I/O controller 250 to I/O controller 270. External interface bus 275, such as an Ethernet or other protocol bus, may provide additional communication between debugging system 205 and SUT 207 if desired. External interface bus 275 may provide a synchronization ability for debugging software 242" to manage further communications with SUT 207, and control of SUT 207, again without employing invasive software techniques. Although the configuration of FIG. 2 represents a cluster mode configuration, other configurations, or architectures, for example symmetrical multi-processor (SMP) architecture, that utilize a high speed and memory mapping interface will function with the disclosed methodology as well.

Figure 3:
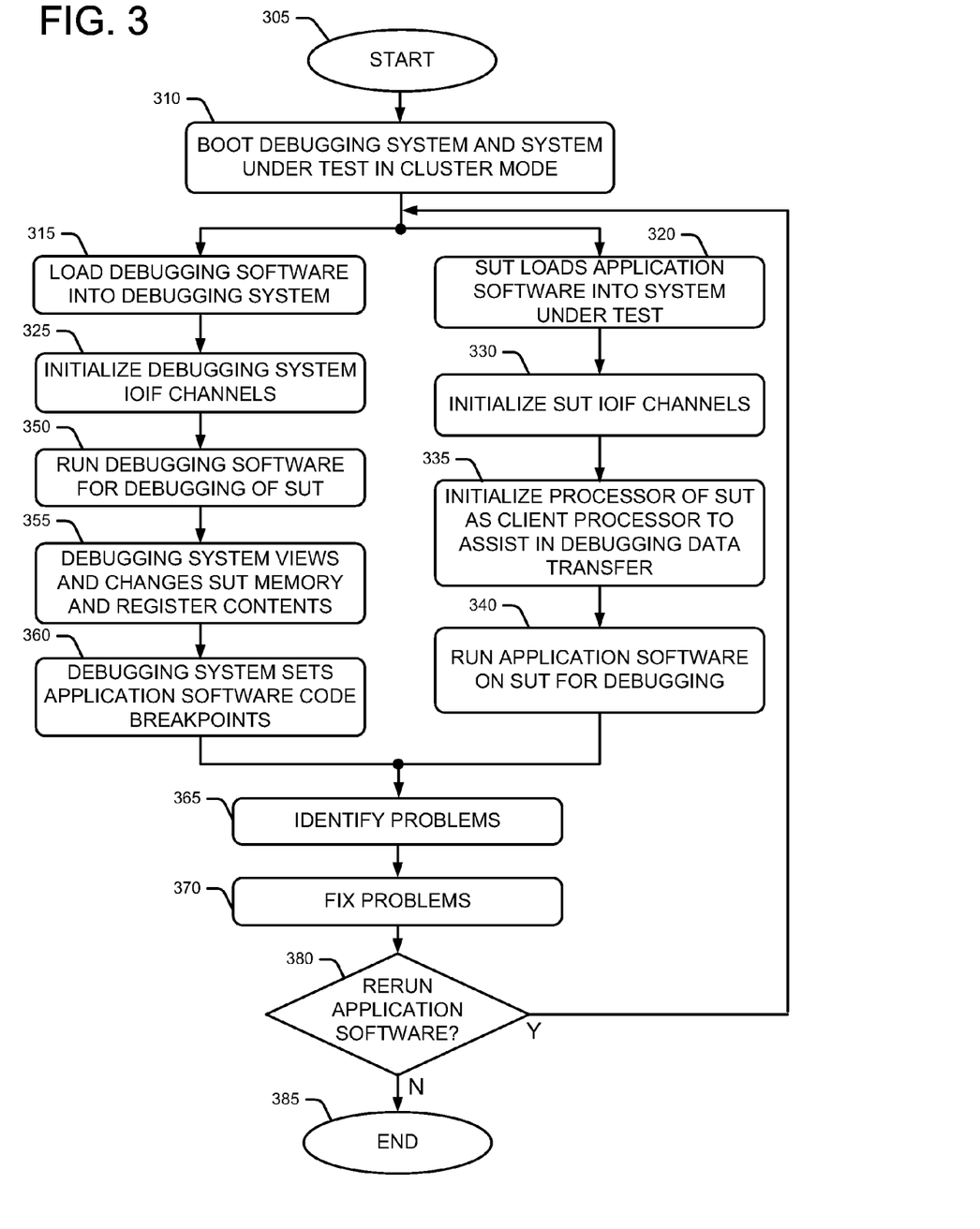
FIG. 3 is a flow chart that depicts the disclosed cluster mode test system methodology.

FIG. 3 is a flowchart that represents one embodiment of the disclosed testing methodology. Process flow begins at start block 305. Operating system software OS 244' initializes debugging processor 210 from memory 240. Concurrently, operating system software OS 264' initializes SUT processor 220 from memory 260. In this manner, both debugging system 205, and SUT 207 initialize or boot in cluster mode, as per block 310. For this example, cluster mode refers to an architectural configuration of multiple IHSs utilizing processors with memory mapping such as the cell broadband engine (CBE) type processors in the block diagram of FIG. 2. Cell broadband engine (CBE) processor are shown in the publication entitled "Cell Broadband Engine Architecture, Version 1.0", by IBM Corp, Sony and Toshiba, Aug. 8, 2005, the disclosure of which is incorporated herein by reference in its entirety. In cooperation with the hardware configuration of FIG. 2, operating system software OS 244' and OS 264' initialize a full memory mapping between debugging system 205 and SUT 207 via high speed interface IOIF0 bus 203. In more detail, physical memory such as memory 240, memory 260, or any other RAM, cache, or other physical memory are available to both the debugging IHS 205 and SUT IHS 207 via IOIF0 203 communications. Registers, such as GPRs 212 and GPRs 222, I/O controller 250, I/O controller 270, and processor local stores are available as well via IOIF0 203 communications. With memory mapping, debugging processor 210 operates as a master with full access to memory 260 or other memory data of SUT processor 220 that operates as a slave. SUT processor 220, operating as a slave, has full access to memory 240 or other memory data of debugging processor 210, operating as a master. Debugging software 242" loads from memory 240 to initiate debugging software in debugging system 205, as per block 315. In parallel with block 315, application software 262' loads from memory 260 to initiate a real time application execution environment in SUT 207, as per block 320. Operating system software 244' in memory 240 of debugging system 205 initializes communications interfaces including specifically IOIF1 215 and the debugging system side of the IOIF0 203 bus or channel, as per block 325. In parallel with block 325, operating system software 264' in memory 260 of SUT 207 initializes communications interfaces including IOIF1 225 and the SUT side of IOIF0 203 channel, as per block 330.

In one embodiment, OS 264' initializes a single processor (not shown) of SUT 207 to act as a client processor for purposes of assisting in the transfer of debugging or test data from SUT 207 across the IOIF0 203 bus or channel to debugging system 205, as per block 335. With communications on interface bus 203 active, and with memory mapping done, and also with OS 264' software executing, SUT 207 begins executing application software 262' as the software for debugging, as per block 340. SUT 207 can now effectively run or execute in a real time environment to perform data calculations, data transfers, and other system functions without impact or accidental effect from neighboring debugging system 205.

OS 244' initializes debugging software 242" in debugging system 205 for the purpose of debugging or testing SUT 207, as per block 350. As part of the test with debugging software 242", debugging system 205 may view, change, or otherwise modify memory or register contents of SUT 207, as per block 355. Debugging software 242" may generate code breakpoints within the application software 262' running on SUT 207 on the fly to interrogate real time data available at specific points of instruction interest in SUT 207. System users calculate code breakpoints as positions in the instruction stream of application software 262' wherein useful data may be found that identify potential areas of system debugging data failure. As described, debugging system 205 sets application software 262' code breakpoints, as per block 360. Once debugging system 205 sets the code breakpoints, debugging system 205 may interrogate physical memory, register data, and other memory map data of SUT 207 by using the IOIF0 bus or channel 203. With application software 262' executing as per block 340, and code breakpoints set, debugging software 242" may identify problems in SUT 207, as per block 365. System users in cooperation with debugging software 242" and other software tools interpret debugging software 242" problem identification data and develop problem fixes, as per block 370. Fixes may include the re-compiling of application software 262' or temporarily modifying memory or register data in SUT 207. After system users fix problems within SUT 207, a system user may decide at decision block 380 to rerun the application software 262' of SUT 207. If so, then process flow continues back to blocks 315 and 320, and debugging efforts begin again. In this case, debugging system 205 and SUT 207 respectively reload debugging software 242' and application software 262', as per block 315 and block 320. However, if the system user decides to discontinue testing at decision block 380, the test methodology process flow ends, as per end block 385.

Figure 4:
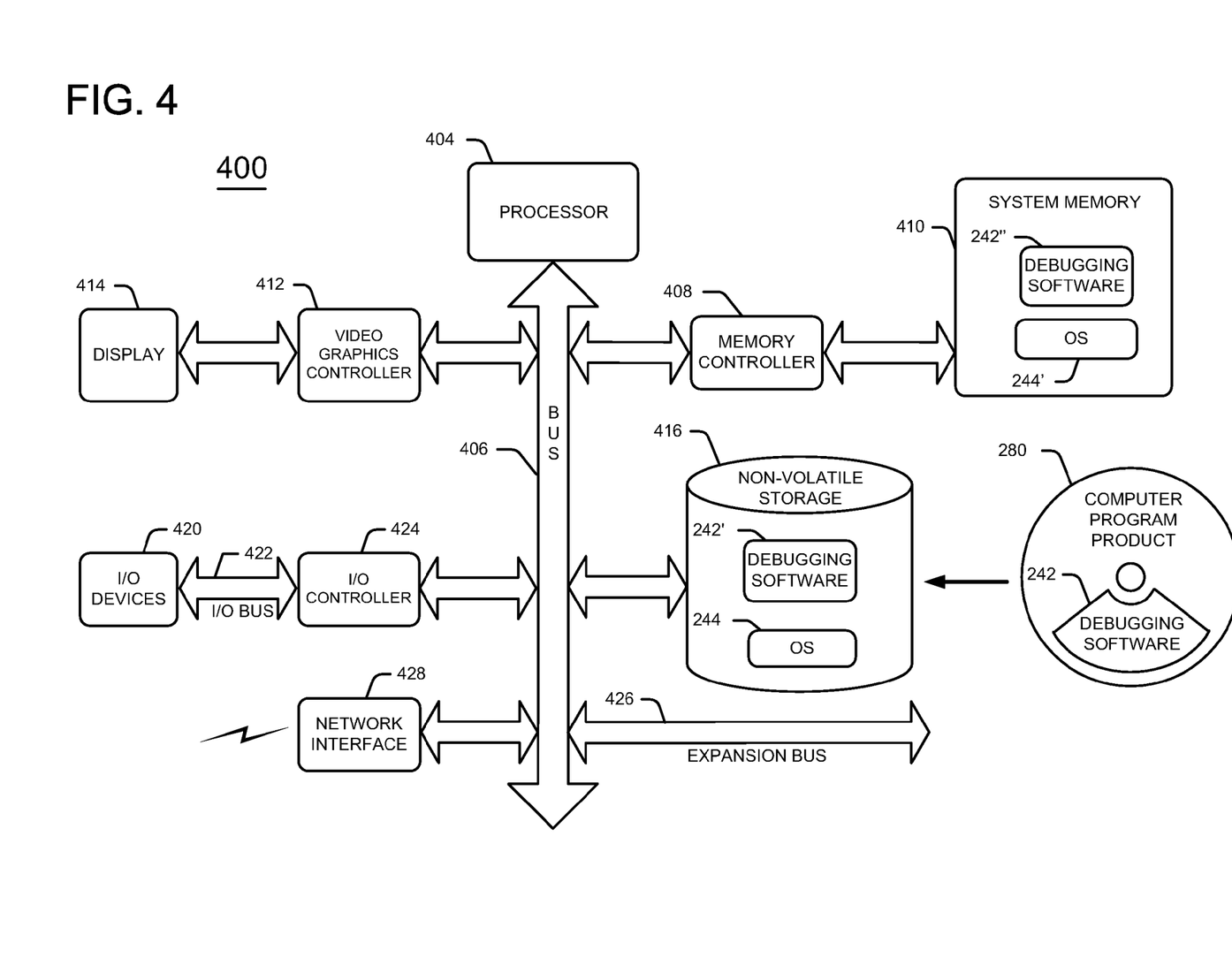
FIG. 4 is a block diagram of an information handling system that employs the disclosed cluster mode debugging software methodology.

FIG. 4 shows an information handling system (IHS) 400 that system 200 may employ as debugging system 205. IHS 400 includes debugging software 242 that enables system users to debug SUT IHSs in special IOIF0 configurations and test application software executing on an SUT IHS in real time. IHS 400 includes a processor 404 that couples to a bus 406. A memory controller 408 couples system memory 410 to bus 406. A video graphics controller 412 couples display 414 to bus 406. IHS 400 includes nonvolatile storage 416, such as a hard disk drive, CD drive, DVD drive, or other nonvolatile storage that couples to bus 406 to provide IHS 400 with permanent storage of information. Nonvolatile storage 416 is a form of data store. An operating system (OS) 244 loads from nonvolatile storage 416 to memory 410 as OS 244' to govern the operation of IHS 400. I/O devices 420, such as a keyboard and a mouse pointing device, couple via I/O bus 422 and I/O controller 424 to bus 406. One or more expansion busses 426, such as USB, IEEE 1394 bus, ATA, SATA, PCI, PCIE and other busses, couple to bus 406 to facilitate the connection of peripherals and devices to IHS 400. A network interface 428 couples to bus 406 to enable IHS 400 to connect by wire or wirelessly to other network devices. IHS 400 may take many forms. For example, IHS 400 may take the form of a desktop, server, portable, laptop, notebook, or other form factor computer or data processing system. IHS 400 may also take other form factors such as a personal digital assistant (PDA), a gaming device, a portable telephone device, a communication device or other devices that include a processor and memory. Another IHS similar to IHS 400 of FIG. 4 may be employed as SUT IHS 207. In that case, such an IHS carries out the functional blocks of the flowchart of FIG. 3 that apply to the SUT IHS.

IHS 400 may employ a compact disk (CD), digital versatile disk (DVD), floppy disk, external hard disk or virtually any other digital storage medium as medium 280. Medium 280 stores debugging software 242 thereon. A user or other entity installs debugging software 242 on IHS 400 prior to usage of this debugging application. The designation, debugging software 242', describes debugging software 242 after installation in non-volatile storage 416 of IHS 400. The designation, debugging software 242", describes debugging software 242 after IHS 400 loads the debugging software into system memory 410 for execution.

Those skilled in the art will appreciate that the various structures disclosed can be implemented in hardware or software. Moreover, the methodology represented by the blocks of the flowchart of FIG. 3 may be embodied in a computer program product, such as a media disk, media drive or other media storage such as computer program product medium 280 of FIG. 2.

In one embodiment, the disclosed methodology is implemented as a debugging software application, namely sets of instructions (program code) in a code module which may, for example, be resident in system memory 410 of IHS 400 of FIG. 4. Until required by IHS 400, the set of instructions may be stored in another memory, for example, non-volatile storage 416 such as a hard disk drive, or in a removable memory such as an optical disk or floppy disk, or downloaded via the Internet or other computer network. Thus, the disclosed methodology may be implemented in a computer program product for use in a computer such as IHS 400. It is noted that in such a software embodiment, code that carries out the functions depicted in the FIG. 3 flow chart may be stored in system memory 410 while such code is being executed. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The foregoing discloses a methodology and apparatus for debugging application software on a system under test (SUT) IHS. In one embodiment, the methodology employs the efficient mapping capability of IOIF0 interfaces to non-invasively debug an SUT (IHS). Debugging results may assist a system programmer, user, or other entity in improving the software performance of the SUT (IHS). The disclosed method may provide non-invasive debugging that is more reliable, accurate and faster than other test practices.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

The invention claimed is:

1. A method of testing a system under test (SUT), the method comprising:

providing a debugging system with a first processor including a first memory mapping input output (I/O) interface and further providing the debugging system with a first I/O controller;

providing the system under test (SUT) with a second processor including a second memory mapping input output (I/O) interface and further providing the SUT with a second I/O controller;

configuring the debugging system and the SUT together in a cluster mode wherein the first processor acts as a debugging master that executes debugging software and the second processor acts as a slave that executes application software, the first processor communicating with the second processor via a memory mapping interface bus between the first and second memory mapping I/O interfaces and further configuring the debugging system and the SUT to communicate with one another via an external bus between the first I/O controller and the second I/O controller; and conducting test operations, by the debugging system, on the SUT wherein the test software in the debugging system accesses at least one of memory, registers and nonvolatile storage of the SUT via the memory mapping interface bus and the debugging system controls the test operations on the SUT via the first and second I/O controllers and external bus.

2. The method of claim 1, further comprising:

changing, by the debugging software in the debugging system acting as a debugging master, a value in the memory of the SUT to influence a test operation in the SUT, the memory of the SUT being memory mapped to the debugging system over the memory mapping interface bus.

3. The method of claim 1, further comprising:

changing, by the debugging software in the debugging system acting as a debugging master, a value in the registers of the SUT to influence a test operation in the SUT, the registers of the SUT being memory mapped to the debugging system over the memory mapping interface bus.

4. The method of claim 1, further comprising:
changing, by the debugging software in the debugging system acting as a debugging master, a value in the nonvolatile storage of the SUT to influence a test operation in the SUT, the nonvolatile storage of the SUT being memory mapped to the debugging system over the memory mapping interface bus.

5. The method of claim 1, wherein the first and second processors are heterogeneous processors exhibiting the same architecture.

6. The method of claim 1, further comprising modifying, by the debugging system, a value in a memory of the debugging system to influence a test operation in the SUT.

7. The method of claim 6, wherein the second processor of the SUT reads the value in the memory of the debugging system across the memory mapping interface bus.

8. A test system comprising:
a debugging system including a first processor, the first processor including a first memory mapping input output (I/O) interface, the debugging system including a first I/O controller;
a system under test (SUT) including a second processor, the second processor including a second memory mapping input output (I/O) interface, the SUT including memory, registers and nonvolatile storage, the SUT including a second I/O controller;
a memory mapping interface bus that couples the first memory mapping I/O interface of the first processor to the second memory mapping I/O interface of the second processor such that the debugging system and the SUT operate in a cluster mode to communicate over the memory mapping interface bus, wherein the first processor of the debugging system acts as a master that executes debugging software and the second processor of the SUT executes application software, thus enabling the debugging system to conduct test operations on the SUT over the memory mapping interface bus; and
an external bus that couples the first I/O controller of the debugging system to the second I/O controller of the SUT such that the debugging system controls the test operations on the SUT by communicating with the SUT via the first and second I/O controllers and the external bus.

9. The test system of claim 8, wherein the debugging software in the debugging system changes a value in the memory of the SUT to influence a test operation in the SUT, the memory of the SUT being memory mapped to the debugging system over the memory mapping interface bus.

10. The test system of claim 8, wherein the debugging software in the debugging system changes a value in the registers of the SUT to influence a test operation in the SUT, the registers of the SUT being memory mapped to the debugging system over the memory mapping interface bus.

11. The test system of claim 8, wherein the debugging software in the debugging system changes a value in the nonvolatile storage of the SUT to influence a test operation in the SUT, the nonvolatile storage of the SUT being memory mapped to the debugging system over the memory mapping interface bus.

12. The test system of claim 8, wherein the first and second processors are heterogeneous processor exhibiting the same architecture.

13. The test system of claim 8, wherein the debugging system includes a memory that is memory mapped over the memory mapping interface bus to the memory in the SUT.

14. The test system of claim 13, wherein the debugging system modifies a value in the memory of the debugging system to influence a test operation in the SUT.

15. A computer program product stored on a computer operable medium for performing testing operations in a testing system that includes a debugging system and a system under test (SUT) that communicate with one another via a memory mapping interface bus therebetween, the computer program product comprising:
instructions for configuring the debugging system and the SUT together in a cluster mode wherein the first processor acts as a debugging master that executes debugging software and the second processor acts as a slave that executes application software, wherein a first processor in the debugging system communicates with a second processor in the SUT via the memory mapping interface bus, and further configuring the debugging system and the SUT to communicate with one another via an external bus between the first I/O controller and the second I/O controller; and
instructions for conducting test operations, by the debugging system, on the SUT wherein the debugging system accesses at least one of memory, registers and nonvolatile storage of the SUT via the memory mapping interface bus, such that the debugging system controls the test operations on the SUT via the first and second I/O controllers and external bus.

16. The computer program product of claim 15, further comprising instructions for changing, by the debugging system acting as a debugging master, a value in the memory of the SUT to influence a test operation in the SUT.

17. The computer program product of claim 15, further comprising instructions for changing, by the debugging system acting as a debugging master, a value in the registers of the SUT to influence a test operation in the SUT.

18. The computer program product of claim 15, further comprising instructions for changing, by the debugging system acting as a debugging master, a value in the nonvolatile storage of the SUT to influence a test operation in the SUT.

19. The computer program product of claim 15, further comprising instructions for modifying, by the debugging system, a value in a memory of the debugging system to influence a test operation in the SUT.

20. The computer program product of claim 15, further comprising instructions for causing the second processor of the SUT to read a value in a memory of the debugging system across the memory mapping interface bus.

* * * * *